Feb. 3, 1948.                E. C. RANEY                2,435,289
                              ALTIMETER
                       Filed March 5, 1943          4 Sheets-Sheet 1

INVENTOR
Estel C. Raney
BY
Warren H. F. Schmieding
ATTORNEY

Feb. 3, 1948.  E. C. RANEY  2,435,289
ALTIMETER
Filed March 5, 1943  4 Sheets-Sheet 2

INVENTOR
Estel C. Raney
BY
Warren W. F. Schmeeding
ATTORNEY

Feb. 3, 1948. E. C. RANEY 2,435,289
ALTIMETER
Filed March 5, 1943 4 Sheets-Sheet 3

INVENTOR
Estel C. Raney
BY
ATTORNEY

Feb. 3, 1948. E. C. RANEY 2,435,289
ALTIMETER
Filed March 5, 1943 4 Sheets-Sheet 4

INVENTOR
Estel C. Raney
BY
Warren H. F. Schmieding
ATTORNEY

Patented Feb. 3, 1948

2,435,289

UNITED STATES PATENT OFFICE 2,435,289

ALTIMETER

Estel C. Raney, Delaware County, Ohio, assignor to Ranco Incorporated, Columbus, Ohio, a corporation of Ohio Application March 5, 1943, Serial No. 478,110

8 Claims. (Cl. 73—387)

The present invention relates to indicating mechanism and more particularly to mechanism for indicating changes in pressure. The present invention is particularly useful when applied to sensitive altimeters.

A sensitive indicator, such as an altimeter employed in airplanes or the like, must be adjustable so that it indicates to the pilot, the height of the ship above a certain location. Such altimeter is adjustable for that purpose by moving mechanism therein and usually the mechanism is associated with indexes having indicia in the form of a barometric scale. The common practice is to move the mechanism and scale so that the reading of the scale corresponds to the barometric pressure at the location. When this is done, the footage scale will indicate the height of the ship above the location.

Altimeters include a pressure sensitive element, such as a hermetically sealed capsule, having a flexible wall which is moved in response to the differences in pressure within the capsule and the environing air. This movement is utilized for changing the position of an altitude indicator. One of the objects of the present invention is to provide for bodily or translatably shifting the capsule to change the position of the indicator operated thereby and for simultaneously moving the barometric scale.

More specifically, it is an object of the present invention to translatably shift the capsule through a cam which is moved simultaneously with the barometric scale.

Since the decrement and increment changes of pressure of air varies at different altitudes, the relative movement between the capsule and the movable foot level indicator must be gradually decreased at increased altitude. One of the objects of the present invention is to employ a cam in the transmission mechanism between the capsule and the foot level indicator, the camming surface thereof being computed so that the capsule transmits increasingly greater movement upon increasing environment pressure surrounding the capsule.

Further objects and advantages will be apparent from the following description, reference being had to the accompanying drawings wherein a preferred form of embodiment of the present invention is clearly shown.

Figure 1:
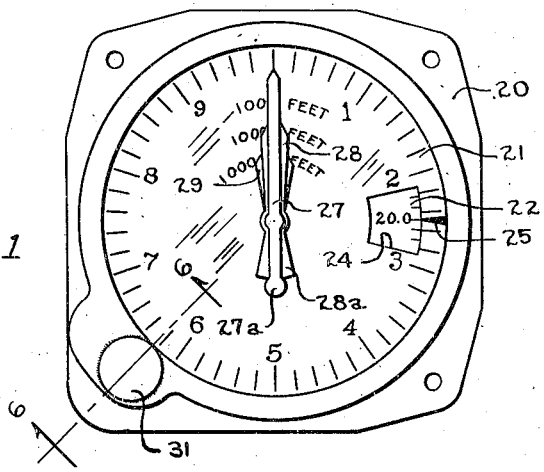
Fig. 1 is a front view in elevation of an altimeter into which the present invention is embodied.
Figure 3A:
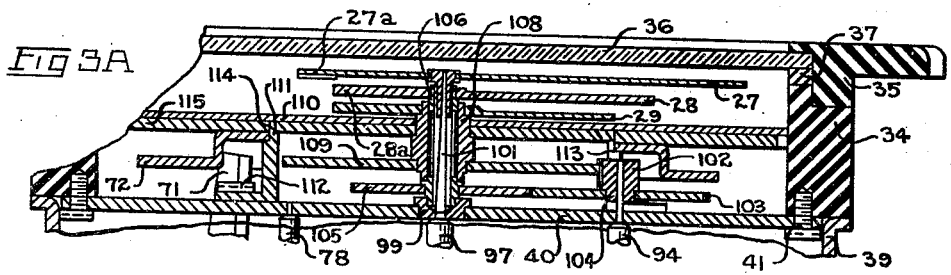
Fig. 3A is a fragmentary sectional view taken on line 3A—3A of Fig. 2.
Figure 3:
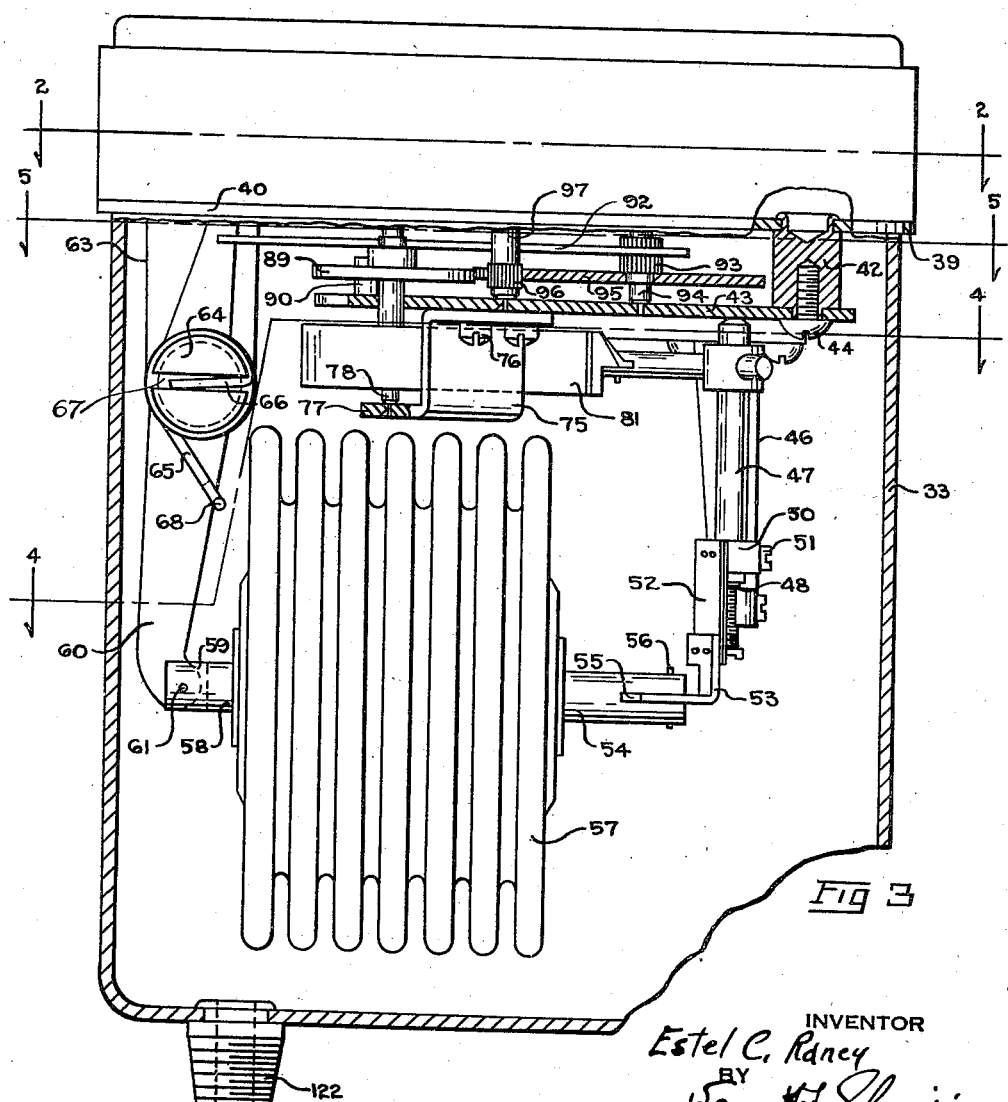
Fig. 3 is a view partly in elevation and partly in section, the section being taken on line 3—3 of Fig. 2.
Figure 4:
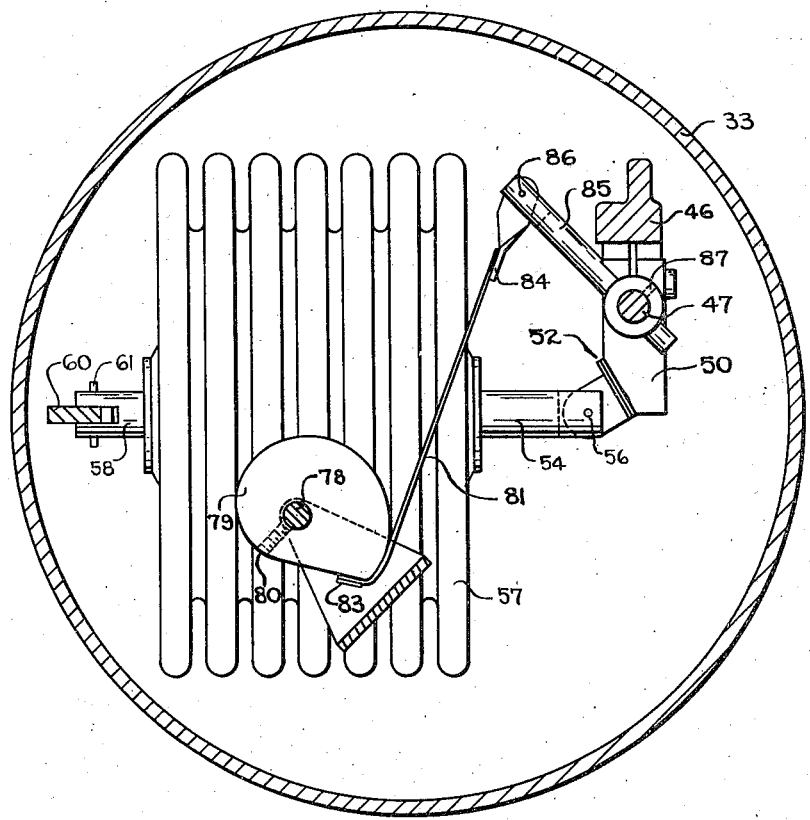
Figure 7:
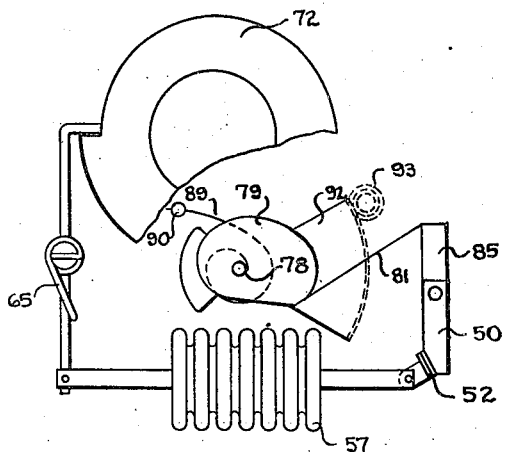
Figure 6:
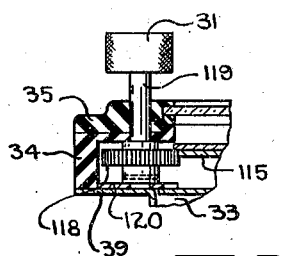
Figure 5:
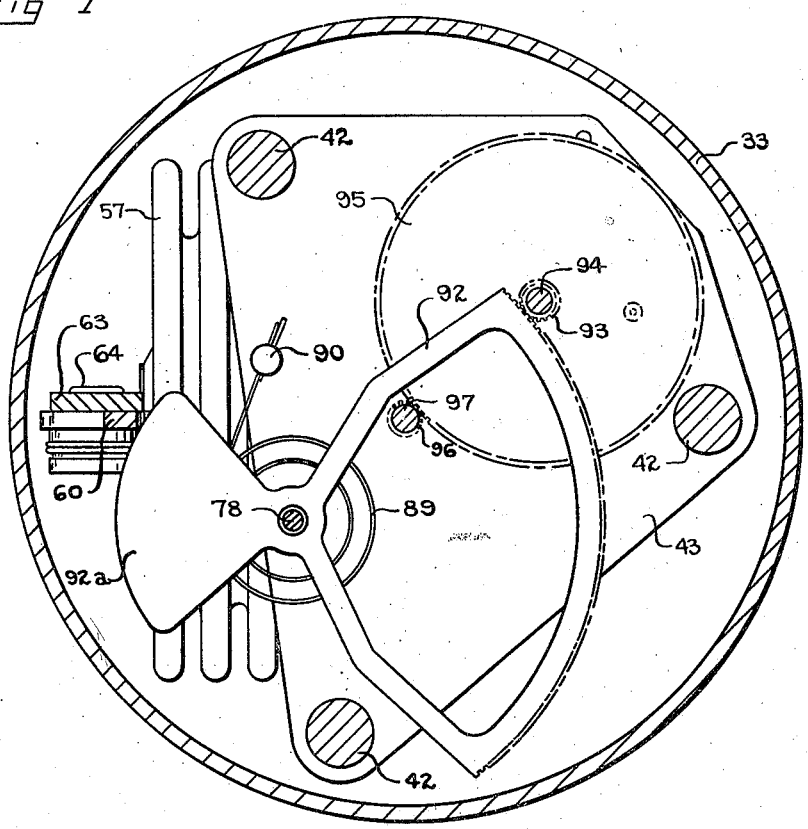

Figs. 4 and 5 are sectional views taken on line 4—4 of Fig. 3; and line 5—5 of Fig. 3, respectively;

Fig. 6 is a sectional view taken on line 6—6 of Fig. 1 but on a smaller scale; and, Fig. 7 is a schematic view of part of the improvement.

Referring to the drawings, for the purpose of illustrating the utility of the present invention, I have embodied the same in an altimeter of the sensitive type. The altimeter includes a casing 20 having a main dial scale 21, from which the altitude is ascertained, and a barometric dial or scale 22. The barometric dial 22 is disposed in back of the altitude scale 21, the scale 21 having an opening 24 therethrough so that a small part of the barometric dial 22 is visible. In addition to the radially arranged indicia in the form of numerals 0 to 9 inclusive and the line indicia, the dial 21 is provided with a stationary index 25 with which the indicia on the barometric dial is adapted to register.

Obviously, any number of pointers may be provided and in the present illustration, I have shown three, 27, 28 and 29. The gear train for operating these pointers is geared so that upon one complete revolution of the pointer 27, pointer 28 will move one-tenth as far and likewise pointer 29 moves one-tenth as fast as pointer 28.

The dial 21 is held stationary with respect to the casing 20 while the dial 22 can be rotated by a knob 31, disposed outside the casing. The indicia on the barometric dial 22 preferably reads in inches of mercury. The mechanism for operating the pointers 27, 28 and 29 is associated with the barometric dial 22 in such a manner that when the position of the dial is changed manually through the knob 31, the pointers are also moved. The purpose of this is to indicate to the pilot the height of the ship above ground level after the dial 22 is so adjusted that the indicia thereon at the index 25 corresponds to the barometric pressure at ground level.

Referring more in detail to the drawings, the casing 20 includes a cup 33 which may be formed of metal, rings 34 and 35 and a glass front 36. Rings 34 and 35 may be formed of Bakelite or the like. Sealing material such as soft rubber 37 is interposed between the glass front 36 and the ring 34 so that when the rings 34 and 35 are secured to the cup 33, the rubber 37 is compressed to hold the glass front 36 in position and seal the same against leaks at the joint between the front 36 and the ring 35. The rings 34 and 35 are secured to the cup 33 by screws which pass inwardly through the rings 34 and 35 and are threaded into the flange 39 on the forward part of the cup 33.

All of the mechanism within the casing is carried by a main plate 40 which is secured to the ring 34 by screws 41. A plurality of rearwardly extending posts 42 are secured to the plate 40 and these posts carry a plate 43 held in place by screws 44. The plate 43 carries a rearwardly extending bracket 46. Bracket 46 carries a shaft 47, the forward end of which is journaled in the plate 43 and the rear end thereof is journaled on a bearing 48. This bearing is in the form of a screw which is threaded into the rear end of bracket 46, the screw being adjustable for providing free rotatiton of the shaft 47. Arm 50 is adjustably secured to the shaft 47 by a screw 51. The end of the arm carries metal strip 52 formed by bimetallic material. This strip extends rearwardly and carries a clip 53; the end of the clip 53 is bent at a right angle and is pivotally attached to a stud 54. The stud 54 is bifurcated at 55 for receiving the clip 53 and the clip 53 is pivotally attached to the stud 54 by the pivot 56.

The stud 54 is attached to one end of a flexible and resilient capsule 57. This capsule is in the form of a bellows formed of thin flexible and resilient metal. The wall of the bellows 57 opposite the stud 54 carries another stud 58. This stud is bifurcated as shown at 59 for receiving one end of a lever 60 which is pivotally attached to the stud 58 by pivot 61. Lever 60 is pivotally attached to a bracket 63 which bracket is suitably attached to and extends rearwardly from the main plate 40. The pivot for lever 60 is in the form of a screw 64. A spring 65 is wound about the screw 64. One end 66 of the spring is held stationarily in the slot 67 of the screw and the other end 68 engages the rearward portion of the lever 60 and normally tends to rotate the lever 60 in a clockwise direction, as viewed in Fig. 3. The lever 60 extends forwardly through a slot 70 in plate 40 and this end 71 of the lever rides upon a cam 72.

From the foregoing it will be seen that when the cam 72 is set in a predetermined position, the left side, as viewed in Fig. 3, of the capsule 57 will be held stationary due to the biasing effect of the spring 65. The spring 65 has sufficient tension to hold the lever 60 in a set position during the normal collapsing action of the bellows 57. Therefore, when the bellows 57 moves towards collapsing position, this movement will be from right to left. All expanding movements of the bellows will be from left to right because the stud 58 is held stationarily since the cam 72 prevents the rotatiton of lever 60. It will be seen, therefore, that all movements imparted by the bellows, due to the expansion and contraction thereof, are imparted to the stud 54 and therefore the shaft 47 will be rotated one way or the other upon expansion or contraction of bellows 57.

Plate 43 carries a rearwardly extending bracket 75 held in place by screws 76. The rear end of bracket 75 is bent at right angles so that the bent portion 77 is parallel with the plate 43. A shaft 78 is journaled at one end in the bracket portion 77 and at the other end in the plate 40. This shaft carries a cam 79 which is secured thereto by a set screw 80. A strap 81 formed preferably of thin flexible and resilient material has one end thereof secured by a screw 83 to the cam 79 and the other end to a clip 84. The clip 84 extends into the slot of the bifurcated arm 85 and is pivotally attached to the arm by a pivot 86. Arm 85 is attached to shaft 47 by a set screw 87. The inner end of a coil spring 89 is secured to the shaft 78 and the outer end of the spring is secured to a stud 90 carried by the plate 43. Spring 89 normally tends to rotate the cam 79 in a clockwise direction, as viewed in Fig. 4. From the foregoing, it will be seen that contraction of the bellows will cause the shaft 47 and the arm 85 carried thereby to move in a clockwise direction to impart a counterclockwise movement to the cam 79 and the shaft 78. Upon expansion of the bellows, the spring will cause the cam 79 to rotate in a clockwise direction.

A segment 92 is secured to the shaft 78 and the toothed end thereof meshes with a pinion 93. Pinion 93 is carried by a shaft 94 which is journaled in the plates 40 and 43. The shaft 94 has secured thereto a gear 95 which meshes with a pinion 96. The pinion 96 is secured to a shaft 97; the rear end of shaft 97 is journaled in the plate 43 and the forward end thereof is journaled in a bearing 99 carried by the plate 40. The forward end of the shaft 97 terminates into a tapered spindle 101 to which the indicator or pointer 27 is attached. From the foregoing it will be seen that when the bellows 57 expands and contracts, clockwise and counterclockwise movements, respectively, are transmitted to the pointer 27. As previously stated, expansion of the bellows 57 causes the spring 89 to impart clockwise movement to the shaft 78. This movement causes counterclockwise movement to be imparted to the shaft 94 through the pinion 93 and the shaft 94 transmits clockwise movement to the spindle 101 through the gear 95 and the pinion 96. When the bellows 57 contracts, counterclockwise movement is imparted to the shaft 78 through the cam 79, strap 81, arm 85, shaft 47, arm 50, strap 52 and clip 53. Thus counterclockwise movement of shaft 78 imparts counterclockwise movement to the spindle 101 through the gear train previously described.

From Fig. 3A it will be seen that the shaft 94 extends forwardly through the plate 40 and carries a pinion gear 102. This pinion gear includes a gear 103 and a pinion 104. The gear 103 meshes with a gear 105 which latter is secured to a bushing 106. The bushing 106 is arranged concentric with and surrounds the spindle 101. The rear end of the bushing 106 is journaled in the bearing 99 and the forward end thereof is journaled in a bushing 108. The extreme forward end of the bushing 106 has secured thereto the indicator or pointer 28.

The pinion 104, which is secured to the shaft 94 meshes with a gear 109 and this gear is attached to the bushing 108. Bushings 106 and 108 are arranged concentrically. The rear end of bushing 108 is journaled on bushing 106 and the forward end of bushing 108 is journaled on the forward wall 110 of a bracket 111. The extreme forward end of bushing 108 carries the indicator or pointer 29. The ratio provided by the gearing is in the order of ten to one as between the indicators 27 and 28 and as between indicators 28 and 29. Thus when the indicator 27 makes one complete revolution clockwise, the indicator 28 will be in alignment with the fifth indicia on numeral 1 and the indicator 29 will have moved one one-hundredth of a revolution.

Figure 2:
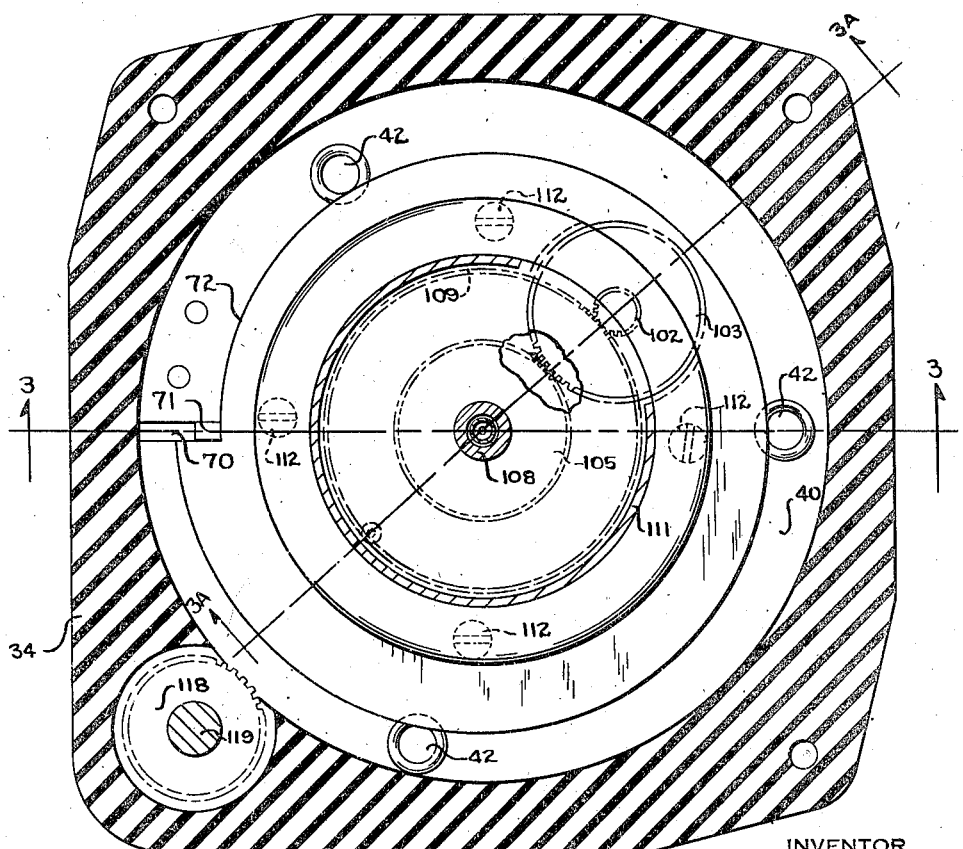
Fig. 2 is a sectional view of the altimeter on a larger scale, the view being taken on line 2—2 of Fig. 3.

Bracket 111 is secured to the forward side of plate 40 by screws 112. The bracket 111 is provided with an opening 113 for receiving the gears 104 and 109. The forward end of bracket 111 is under-cut at 114 in the form of a circle upon which the cam 72 is journaled. Cam 72 is attached to a large gear 115 which is also journaled on the under-cut portion 114. The cam 72 is shown in one of its extreme positions. It will be observed from Fig. 2 that, when the cam 72 is rotated in a counterclockwise direction, the upper end 71 of lever 60 will be forced outwardly against the tension of spring 65 and the entire bellows assembly will be bodily or translatably shifted to the right as viewed in Fig. 3. This will cause the indicators 27, 28 and 29 to be rotated in a clockwise direction. Now when the cam 72 is rotated clockwise, the indicators 27, 28 and 29 will be rotated in a counterclockwise direction, since the spring 65 will force the bellows to the left as viewed in Fig. 3.

The forward face of gear 115 forms the barometric dial and is calibrated with the numerals 20.0 to 30.0 including the fractions of said numerals. This calibration is spread over substantially the entire circumference of the gear 115 so that upon substantially one complete revolution of the gear, there will be a change in barometric readings at the index 25 of approximately ten inches of mercury. The slope of the cam is computed in respect to the indicia on the barometric scale so that when it is moved from one extreme position to the other, it imparts such movement to the indicators 27, 28 and 29 to equal the difference in elevation corresponding to approximately ten inches of mercury. The purpose of this adjustment mechanism is to indicate to the pilot the height of the ship with respect to a field upon which he desires to land or desires to bomb. For example, if the pilot knows the barometric pressure at ground level at the place he desires to land, he will set the barometric scale at a point wherein the indicia, corresponding to the barometric pressure, registers with the index 25. The indicators 27, 28 and 29 will be then moved in one direction or the other and they will then indicate to the pilot his exact elevation above the landing field. The gear 115 may be rotated from the outer side or face of the altimeter and for this purpose there is provided a meshing gear 118. Gear 118 is carried by shaft 119 which also carries the knob 31 (see Fig. 6). It will also be observed from Fig. 6 and Fig. 1 that the rings 34 and 35 are provided with an extended portion for housing the gear 118. The shaft 119 is journaled in the ring 35 and in a plate 120 suitably secured to the forward side of the flange 39 of the cup 33.

Since the increment change of pressure does not vary directly with the increment of elevation in footage, it is necessary to decrease the relative rate of movement of the gear train upon decreasing environment pressure on the bellows. To accomplish this, the surface of the cam 79 is varibly pitched so as to gradually decelerate the rate of movement of the shaft 78 as the bellows moves to the right as viewed in Figs. 3 and 4 and the shape of the surface of the cam 79 has been computed so that the rate of movement between the bellows and the gear train is varied to accord with the known barometric and footage computations.

Altimeters are usually placed in the cabin of the plane and in order to cause the bellows to respond to the environment pressure of the plane, the interior thereof is sealed from the pressure in the cabin and is subjected only to the environment pressure surrounding the airplane. For this purpose the rear of the cup 33 is provided with a coupling 122 by which a connection can be made through a hose or tube to the exterior of the airplane.

The mechanism must function properly regardless of its position. Therefore, all of the parts which are not inherently counterbalanced, such as the circular gears, are provided with counterbalances so that the parts will not disturb the intended movements which are to be imparted to the indicator. This counterbalancing is well known in the art and therefore, in order to simplify the disclosure, only a few counterbalances are fully shown, as for example, there are shown counterbalances 27a, 28a and 92a for pointers 27 and 28 and segment 92, respectively. Likewise, the environment temperature about the mechanism is subjected to changes. These changes of temperature will affect the movement of some of the parts due to elongation and contraction thereof. Suitable compensating elements are employed for causing the mechanism to function properly although elongation and contraction of the parts take place. These compensating elements are well known in the art and one is shown herein in the form of the bimetallic strip 52.

While the form of embodiment of the present invention as herein disclosed constitute a preferred form, it is to be understood that other forms might be adopted, all coming within the scope of the claims which follow.

I claim:

1. In an altimeter of the type having a dial with equally spaced graduations and an index member movable relative thereto, means including an element sensitive to changes in air pressure for imparting movement to said member, means between said element and said member for compensating for variations between the increment change of pressure and the increment of elevation in footage, additional means having indicia to show elevation, said last mentioned means normally being stationary, and means for simultaneously adjusting said additional means and said air pressure responsive element to a predetermined setting.

2. In an altimeter of the type having a scale member with equally spaced graduations and an index member, means including an element sensitive to changes in air pressure for imparting movement to one of said members relative to the other of said members, means between said element and the said member moved thereby for compensating for variations between the increment change of pressure and the increment of elevation in footage, additional means having indicia to show elevation, said last mentioned means normally being stationary, and means for simultaneously adjusting said additional means and said air pressure responsive element to a predetermined setting.

3. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element, a lever having a pivotal connection with and solely suspending the other of said parts of the condition responsive element; a dial; and means for moving said lever to shift the position of said condition responsive element with respect to the rotatable element and for simultaneously moving said dial.

4. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element, a pivotally mounted lever, the other of said parts of the conditioning responsive element being pivotally and solely suspended by said lever; a dial; and means for turning the lever on the pivot therefor to shift the position of said condition responsive element with respect to the rotatable element and for simultaneously moving said dial.

5. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element; a dial; and mechanism for simultaneously moving the dial and for translatably shifting the position of said condition responsive element with respect to said rotatable element, said mechanism including a cam controlled adjustable member pivotally connected to one end and solely suspending the other of the parts of the condition responsive element.

6. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element; a dial; and mechanism including a pivotally mounted lever, the other part of said condition responsive element being pivotally and solely suspended by said lever, and means for simultaneously moving said dial and said lever.

7. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element; a pivotally mounted dial; a cam attached to the dial and movable therewith; a cam follower riding on the cam, said cam follower being connected with the other part of the condition responsive device; and means for rotating the dial and cam.

8. In a measuring instrument, in combination, a member having graduated indicia; an index member for the graduated indicia; means for moving one of said members relative to the other, said means including a rotatable element for driving the movable member, means for imparting rotary movement to said rotatable element including an element responsive to changes in a condition, said last element having relatively movable parts, one of said parts being movable in response to changes in said condition and supported by and adapted when moved to impart rotational movement to the rotating element; a pivotally mounted dial; a cam attached to the dial and movable therewith; a lever forming a cam follower riding on the cam, said lever being connected with the other part of the condition responsive device; and means for rotating the dial and cam.

ESTEL C. RANEY.

REFERENCES CITED

The following references are of record in the file of this patent:

UNITED STATES PATENTS

| Number | Name | Date |
|---|---|---|
| Re. 19,079 | Kollsman | Feb. 13, 1934 |
| 1,351,130 | Roesch | Aug. 31, 1920 |
| 1,377,052 | Starling et al. | May 3, 1921 |
| 1,866,660 | Luckey et al. | July 12, 1932 |
| 1,970,544 | Carbonara | Aug. 21, 1934 |
| 2,002,874 | Urfer | May 28, 1935 |
| 2,023,825 | Urfer | Dec. 10, 1935 |
| 2,081,950 | Nesbitt | June 1, 1937 |
| 2,332,565 | Fairbank | Oct. 26, 1943 |
| 2,124,072 | Luckey et al. | July 19, 1938 |
| 2,167,412 | Baesecke | July 25, 1939 |

FOREIGN PATENTS

| Number | Country | Date |
|---|---|---|
| 208,772 | Switzerland | May 16, 1940 |
| 436,552 | Great Britain | Oct. 14, 1935 |
| 375,578 | Italy | Oct. 14, 1939 |